(12) United States Patent
Kurabayashi (10) Patent No.: US 11,877,060 B2
(45) Date of Patent: Jan. 16, 2024

(54) METHOD, PROGRAM, AND ELECTRONIC DEVICE FOR STABILIZATION OF IMAGE ACQUISITION USING KNOWN IMAGE

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/806,007

(22) Filed: Jun. 8, 2022

(65) Prior Publication Data
US 2022/0303466 A1    Sep. 22, 2022

Related U.S. Application Data (63) Continuation of application No. PCT/JP2020/045990, filed on Dec. 10, 2020.

(30) Foreign Application Priority Data

Dec. 11, 2019 (JP) ................ 2019-223461

(51) Int. Cl.
*H04N 23/63* (2023.01)
*H04N 23/68* (2023.01)
*G06T 7/246* (2017.01)

(52) U.S. Cl.
CPC ......... *H04N 23/6811* (2023.01); *G06T 7/248* (2017.01); *H04N 23/633* (2023.01)

(58) Field of Classification Search
CPC .. H04N 23/6811; H04N 23/633; H04N 23/61; H04N 23/64; H04N 23/6812;
(Continued)

(56) References Cited

U.S. PATENT DOCUMENTS

| | | | |
|---|---|---|---|
| 2006/0170781 A1* | 8/2006 | Sobol | H04N 23/68 348/208.4 |
| 2020/0026921 A1 | 1/2020 | Kurabayashi | |
| 2021/0217193 A1* | 7/2021 | Nakamatsu | G01B 11/26 |

FOREIGN PATENT DOCUMENTS

| | | |
|---|---|---|
| JP | 2018173811 A | 11/2018 |
| WO | 2019163124 A1 | 8/2019 |

OTHER PUBLICATIONS

International Search Report issued in International Application No. PCT/JP2020/045990, dated Feb. 9, 2021 (5 pages).
(Continued)

*Primary Examiner* — Mekonnen D Dagnew
(74) *Attorney, Agent, or Firm* — Osha Bergman Watanabe & Burton LLP (57) ABSTRACT

Provided is an electronic device including: a sensor; an image acquisition unit; a storage unit that stores a reference image that is an image of a target object; a feature-point position determining unit that determines the positions of feature points indicating local feature quantities in the reference image; a feature-point distance calculating unit that repeatedly executes detection of points corresponding to the feature points in the reference image from the acquired image of the space and calculation of the distances with respect to the positions of the detected points; a judgment unit that judges whether the amount of movement is equal to or less than a predetermined allowable reference value; and a control unit that obtains the acquired image of the space and stores the image of the space if it is judged that the amount of movement is equal to or less than the allowable reference value.

12 Claims, 8 Drawing Sheets

(58) Field of Classification Search
CPC .......... H04N 23/695; G06T 7/248; G06T 2207/30244; G03B 15/00; G03B 17/00; G03B 17/18
See application file for complete search history.

(56) References Cited

OTHER PUBLICATIONS

Written Opinion issued in International Application No. PCT/JP2020/045990; dated Feb. 9, 2021 (3 pages).
Office Action in the counterpart Chinese Application No. 202080085708.5, dated Jun. 27, 2023 (15 pages).

* cited by examiner

METHOD, PROGRAM, AND ELECTRONIC DEVICE FOR STABILIZATION OF IMAGE ACQUISITION USING KNOWN IMAGE

TECHNICAL FIELD

The present invention relates to a method, a program, and an electronic device for stabilization of image acquisition using a known image.

BACKGROUND ART

There are known check-in services for granting privileges for online games etc. to users who have visited predetermined spots, such as shops etc. Patent Literature 1 discloses a system in which, when a service for granting a privilege etc. for an online game to a user of a mobile terminal device who has visited a spot where a predetermined posted notice is posted is provided, if it is judged that an image of the posted notice has been acquired inside an image-acquisition region on the basis of a known reference image that is an image of the posted notice stored in a mobile-terminal storage unit, the user is allowed to acquire an image of the posted notice and a peripheral area thereof, a normalized image that is obtained by normalizing this acquired image is compared with a certified image that has already been certified and stored in a server, and a visit of the user is confirmed on the basis of the similarity therebetween.

CITATION LIST

Patent Literature

{Patent Literature 1} Japanese Unexamined Patent Application, Publication No. 2018-173811 (Publication of Japanese Patent No. 6181893)

SUMMARY OF INVENTION

Technical Problem

However, there are cases in which authenticity judgment for the image cannot be performed accurately due to a reduction in image quality, such as image distortion with blur caused by camera shake or the like when the image of the posted notice and the peripheral area thereof is acquired.

Solution to Problem

The present invention has been made in view of the above-described problem and has features as described below. That is, according to one embodiment, the present invention provides a method executed by an electronic device for acquiring an image including the surroundings of a target object, the electronic device including at least one sensor from among a gyro sensor, an acceleration sensor, and an orientation sensor, an image acquisition unit, and a storage unit for storing a reference image that is an image of the target object, and the method characterized by including: a step of determining the positions of feature points indicating local feature quantities in the reference image in the case where the reference image is placed inside a predetermined region of an image of a space to be acquired by the image acquisition unit; and a step of repeatedly calculating feature-point distances, the step repeatedly executing a step of acquiring an image of the space by means of the image acquisition unit, a step of detecting, from the image of the space acquired by the image acquisition unit, points corresponding to the feature points in the reference image, and a step of calculating the distances between the positions of the detected points corresponding to the feature points in the reference image and the determined positions of the feature points corresponding to the detected points; a judgment step of judging whether the amount of movement of the electronic device is equal to or less than a predetermined allowable reference value, on the basis of the amount of change in sensor value obtained from the at least one sensor of the sensors and the calculated distances; and an image storing step of storing the image of the space, which is acquired by the image acquisition unit, in the storage unit as a desired image if it is judged that the amount of movement of the electronic device is equal to or less than the allowable reference value.

In the step of calculating the distances, a statistic of the distances between the positions of the detected points corresponding to the feature points in the reference image and the determined positions of the feature points corresponding to the detected points may be calculated.

The statistic of the distances may be a statistic of the distance differences between the repeatedly calculated distances.

In the judgment step, it may be judged that the amount of movement of the electronic device is equal to or less than the predetermined allowable reference value if the total of the amounts of change in sensor value during a predetermined period of time is equal to or less than a predetermined sensor-value-change threshold and if the statistic of the distances is equal to or less than a predetermined distance threshold.

The image storing step may be able to be executed if the number of the points corresponding to the feature points, the points being detected in the acquired image of the space, is equal to or greater than a predetermined number.

Furthermore, the storage unit may store two or more template images for target-object images, and the reference image may be one template image determined from among the two or more template images, and the method may further include: a step of selecting one template image from among the two or more template images; a step of acquiring an image of the space by means of the image acquisition unit; a step of detecting, from the image of the space acquired by the image acquisition unit, points corresponding to feature points in the selected one template image; and a step of determining the selected one template image as the reference image in the case where the number of the detected points corresponding to the feature points is equal to or greater than a predetermined reference value.

Furthermore, it is also possible to further include a step of displaying, when the image of the space acquired by the image acquisition unit is displayed on a display unit of the electronic device, lines connecting the positions of the feature points, in the case where the reference image is placed inside the predetermined region of the image of the space acquired by the image acquisition unit, to the positions of the detected points corresponding to the feature points.

The image stored as the desired image can be used to confirm that a user of the electronic device has visited a predetermined posting spot and has viewed a posted notice that serves as the target object and that is posted at the posting spot.

Furthermore, according to one embodiment, the present invention provides a program for causing one or more computers to execute the above-described method.

According to one embodiment, the present invention provides a computer-readable recording medium that stores the above-described program.

According to one embodiment, the present invention provides an electronic device that acquires an image including the surroundings of a target object, the electronic device characterized by including: at least one sensor from among a gyro sensor, an acceleration sensor, and an orientation sensor; an image acquisition unit; a storage unit that stores a reference image that is an image of the target object; a feature-point position determining unit that determines the positions of feature points indicating local feature quantities in the reference image in the case where the reference image is placed inside a predetermined region of an image of a space to be acquired by the image acquisition unit; a feature-point distance calculating unit that repeatedly calculates feature-point distances, the feature-point distance calculating unit repeatedly executing obtaining an image of the space acquired by the image acquisition unit, detecting, from the image of the space acquired by the image acquisition unit, points corresponding to the feature points in the reference image, and calculating the distances between the positions of the detected points corresponding to the feature points in the reference image and the determined positions of the feature points corresponding to the detected points; a judgment unit that judges whether the amount of movement of the electronic device is equal to or less than a predetermined allowable reference value, on the basis of the amount of change in sensor value obtained from the at least one sensor of the sensors and the calculated distances; and a control unit that stores the image of the space, which is acquired by the image acquisition unit, in the storage unit as a desired image if it is judged that the amount of movement of the electronic device is equal to or less than the allowable reference value.

Advantageous Effects of Invention

According to the present invention, it becomes possible, with an electronic device being stabilized, to acquire a target-object image including a peripheral image from a certain distance and angle, thereby making it possible to prevent a reduction in image quality, such as image distortion with blur caused by camera shake or the like.

DESCRIPTION OF EMBODIMENTS

Figure 1:
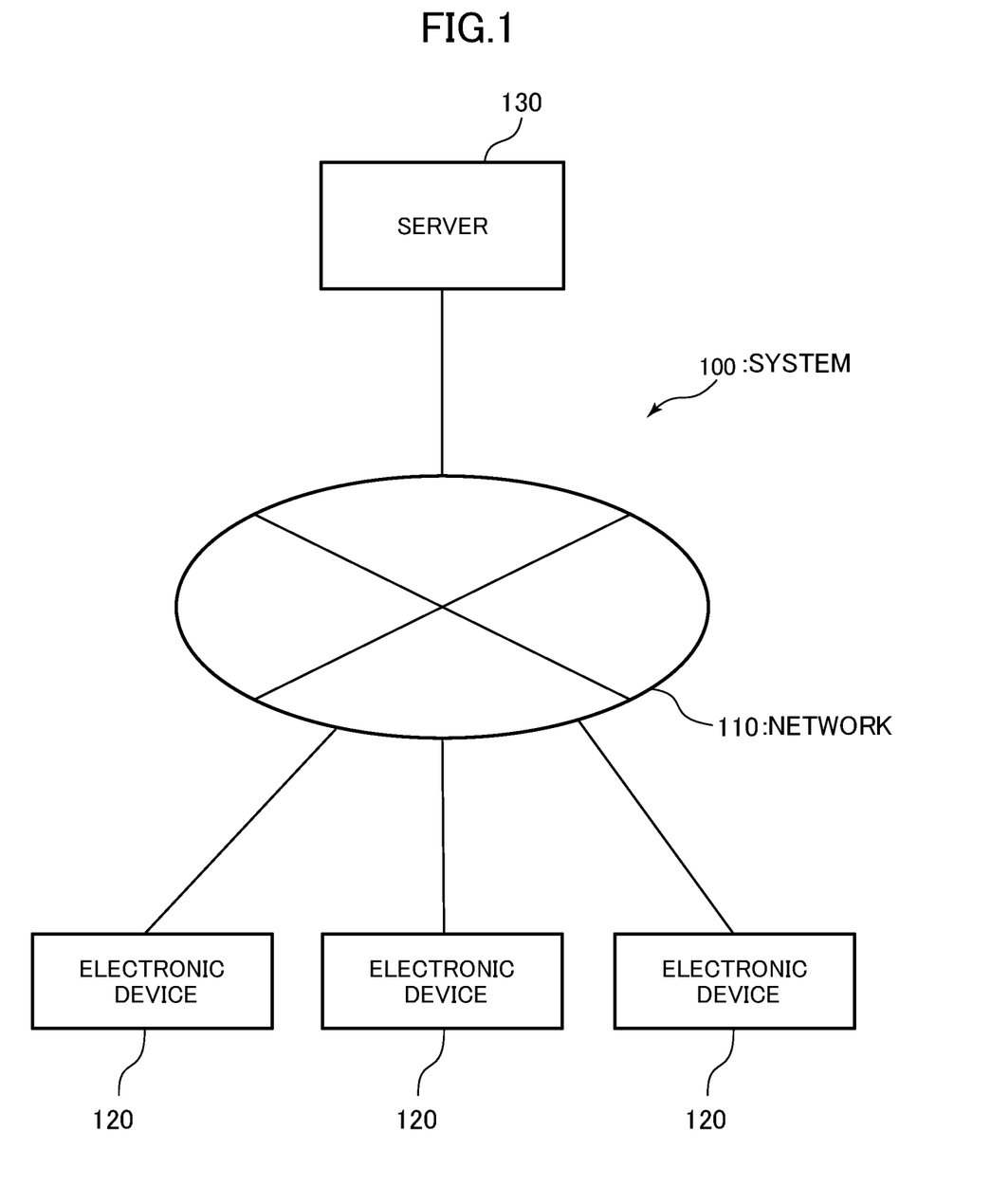
FIG. 1 is a view showing the overall configuration of a system according to one embodiment of the present invention.

One embodiment of a viewing confirmation system using the present invention will be described below with reference to the accompanying drawings. As shown in FIG. 1, a system 100 of this embodiment can be realized by a system including one or more electronic devices 120 and a server 130 that are communicatively connected to each other via a network 110, such as the Internet.

Figure 2:
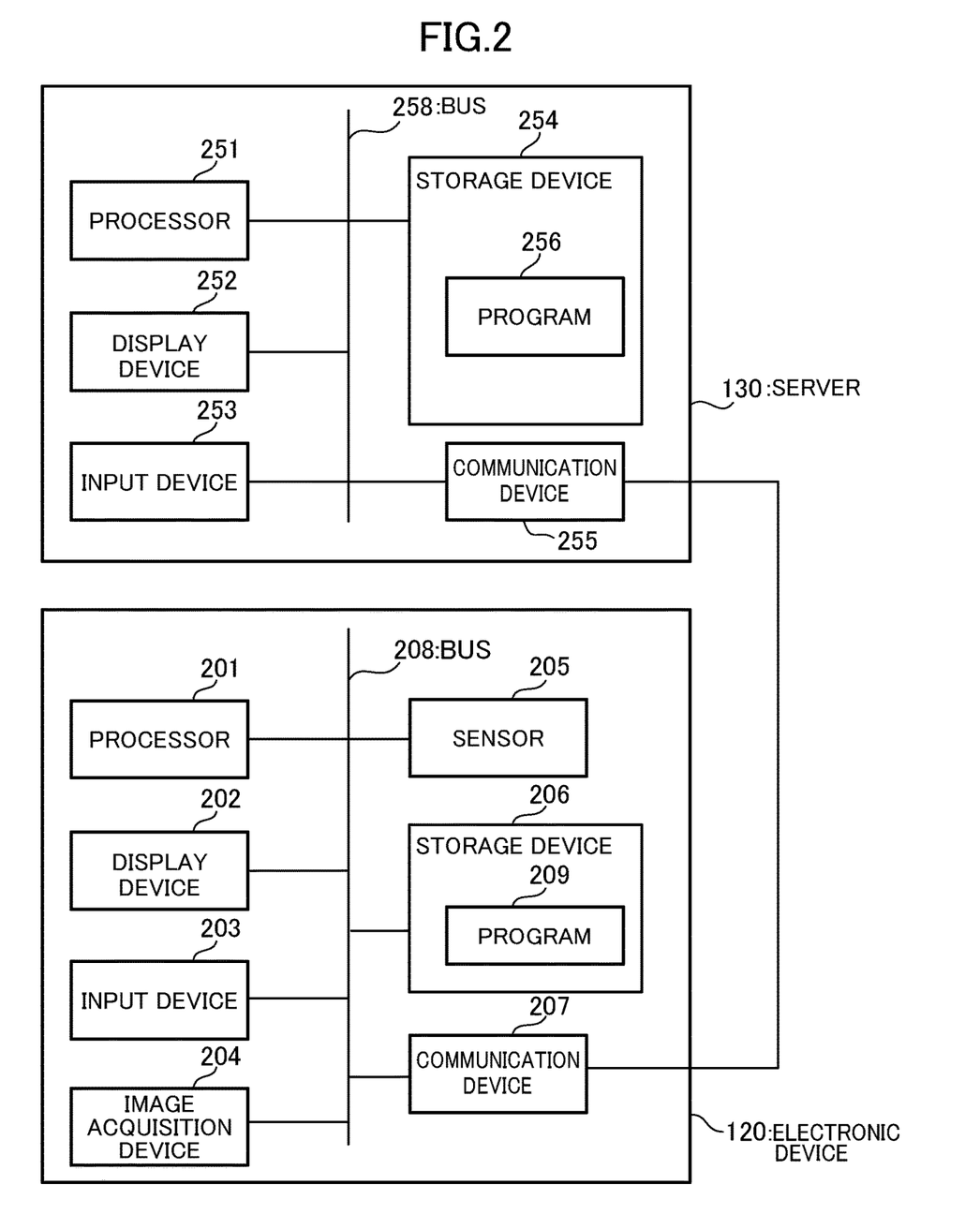
FIG. 2 shows hardware configuration diagrams of an electronic device and a server according to the embodiment of the present invention.

FIG. 2 includes block diagrams showing the hardware configuration of each of the electronic devices 120 and that of the server 130 according to the embodiment of the present invention. The electronic device 120 includes a processor 201, a display device 202, an input device 203, an image acquisition device 204, a sensor 205, a storage device 206, and a communication device 207. These constituent devices are connected by a bus 208. Note that it is assumed that interfaces are interposed as needed between the bus 208 and the individual constituent devices. In this embodiment, the electronic device 120 is a smartphone. Alternatively, the electronic device 120 may be a terminal, such as a mobile phone, a tablet terminal, a portable game machine, or a digital camera, as long as the terminal includes the configuration described above.

Similarly, the server 130 includes a processor 251, a display device 252, an input device 253, a storage device 254, and a communication device 255. These constituent devices are connected by a bus 258. Note that it is assumed that interfaces are interposed as needed between the bus 258 and the individual constituent devices. In this embodiment, the server 130 is realized by a computer.

The processors 201 and 251 control the overall operations at the electronic device 120 and the server 130, respectively, and are CPUs, for example. Note that electronic circuits such as MPUs may also be used as the processors 201 and 251. The processors 201 and 251 load and execute programs 209 and 256 and data that are stored in the storage devices 206 and 254, respectively, thereby making it possible to execute various kinds of processing required to carry out the present invention.

The display devices (displays) 202 and 252 display application screens etc. to a user of the electronic device 120 and a user of the server 130 under the control of the processors 201 and 251, respectively. The display devices 202 and 252 are preferably liquid crystal displays or may be displays using organic EL, plasma displays, or the like.

The input devices 203 and 253 are user interfaces for accepting inputs from the users to the electronic device 120 and the server 130, and are, for example, touchscreens, touchpads, keyboards, or mouses. In this embodiment, since the electronic device 120 is a smartphone, the electronic device 120 includes a touchscreen as the input device 203, and the touchscreen also functions as the display device 202, whereby the display device 202 and the input device 203 have an integrated structure. The display device 202 and the input device 203 may have separate forms disposed at different positions. Since the server 130 is a computer, it is assumed that the server 130 includes a keyboard and a mouse as the input device and includes a liquid crystal display as the display device.

The image acquisition device 204 can be a camera for acquiring still images or moving images of real space areas. The sensor 205 can measure information related to movement of the electronic device and can be at least one sensor of a gyro sensor, an acceleration sensor, and an orientation sensor.

The storage devices 206 and 254 are storage devices that include main memories, buffer memories, and storages and that are included in general smartphones and computers, such as magnetic storage devices and storage devices that use RAMs, which are volatile memories, and flash memories, which are non-volatile memories, such as eMMCs, UFSs, or SSDs. The storage devices 206 and 254 can include external memories. For example, the storage device 206 stores an application, and the storage device 254 stores a server application. The applications include programs for executing events of the applications and various kinds of data to be referred to when the programs are executed.

The communication devices 207 and 255 can send data to and receive data from other devices via the network 110 (not shown in FIG. 2). For example, the communication devices 207 and 255 perform mobile communication or wireless communication, such as that using a wireless LAN, to connect to the network 110. The electronic device 120 uses the communication device 207 to communicate with the server 130 via the network. The communication devices 207 and 255 may also perform wired communication using an Ethernet (registered trademark) cable or the like.

Figure 3:
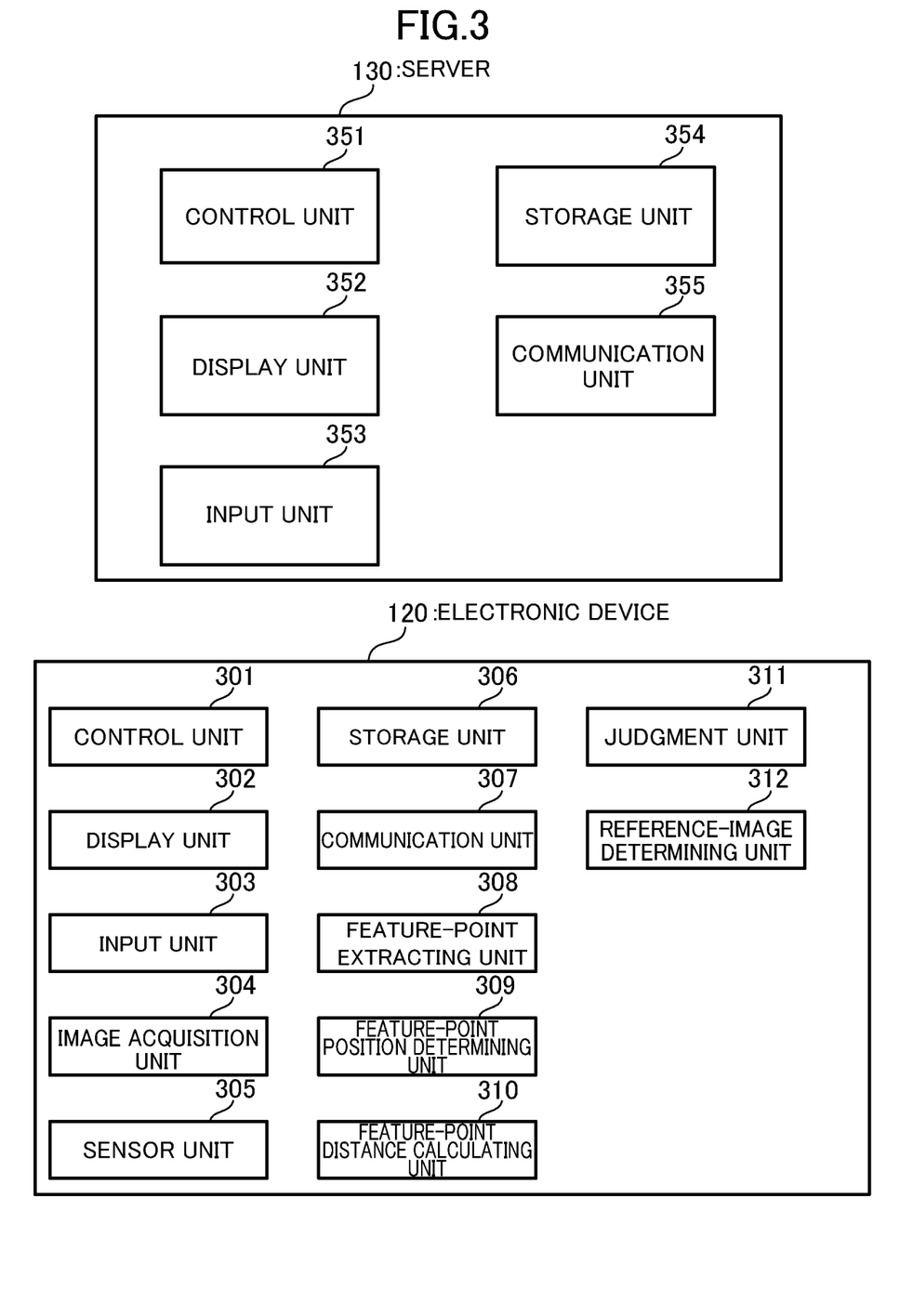
FIG. 3 shows functional block diagrams of the electronic device and the server according to the embodiment of the present invention.

FIG. 3 shows examples of functional block diagrams of the electronic device 120 and the server 130 according to the embodiment of the present invention. The electronic device 120 includes a control unit 301, a display unit 302, an input unit 303, an image acquisition unit 304, a sensor unit 305, a storage unit 306, a communication unit 307, a feature-point extracting unit 308, a feature-point position determining unit 309, a feature-point distance calculating unit 310, a judgment unit 311, and a reference-image determining unit 312. The server 130 includes a control unit 351, a display unit 352, an input unit 353, a storage unit 354, and a communication unit 355.

In this embodiment, these functions are realized when the processors 201 and 251 execute programs. For example, the programs to be executed are stored in the storage devices 206 and 254. Since various kinds of functions are realized by loading the programs, as described above, a portion or the entirety of one part (function) may be included in another part. Alternatively, these functions may also be realized by means of hardware by configuring electronic circuits or the like each realizing a portion or the entirety of each of the functions.

The control unit 301 of the electronic device 120 executes control processing when the functions of the application of this embodiment are executed. The display unit 302 displays application screens for controlling the functions of the application and displays application screens in accordance with the functions of the application and user operations. Furthermore, the display unit 302 displays images acquired by the image acquisition device 204. The input unit 303 accepts inputs from the user of the electronic device 120. In this embodiment, a touchscreen that includes the display unit 302 and the input unit 303 is used, and an operation accepting unit is realized by a touch detection function.

The image acquisition unit 304 acquires still images or moving images of real space areas. Image acquisition means to generate digital data in JPEG format etc. for still images or digital data in MPEG format etc. for moving images. Here, the image acquisition unit 304 can perform image acquisition at 30 frames per second or 60 frames per second, for example, can temporarily store, in a buffer included in the storage unit 306, acquired images in the individual frames, and can display the images on the display unit 302. The sensor unit 305 can be realized by using the sensor 205 and measures at least one sensor value that indicates information related to movement of the electronic device, such as information indicating the angular velocity when the electronic device is rotated, information indicating the acceleration when the electronic device is moved, or information indicating the orientation of the electronic device.

The storage unit 306 stores information needed for information processing executed by the control unit 301. In this embodiment, it is assumed that a target object is a notice posted at a predetermined posting spot. The storage unit 306 stores template images, which are known posted-notice images, so as to be linked with items of posted-notice identification information (IDs), which indicate kinds of posted notices. The template images can be, for example, bitmap image data. Although a plurality of kinds of posted notices are used in this embodiment, it is also possible that only one kind of a posted notice is used. In the case where there is only one kind of template image, the template image need not be linked with a posted-notice ID. One image selected from the template images can be determined as a reference image. The reference image is an image serving as the reference determined, as a criterion for judgment, from among the plurality of template images by the reference-image determining unit 312, to be described later.

The template images can be downloaded, while being included in a viewing confirmation application, from the server 130 to the storage unit 306 of the electronic device 120, for example. The template images stored in the storage unit 306 of the electronic device can be updated at a predetermined timing on the basis of information received from the server 130 via the communication unit 307. For example, a reference posted-notice image can be downloaded for updating at an updating timing in a game event for privilege assignment or at fixed intervals. Alternatively, a reference posted-notice image may be obtained from the server 130 and stored in the storage unit 306 every time before the viewing-confirmation processing is executed. Alternatively, a reference posted-notice image may be downloaded when the viewing confirmation application is used as a web browser to access a website for acquiring a viewing image.

The storage unit 306 can store an image of a real space area acquired by the image acquisition unit 304 as a desired image and, in order to store this desired image, has a function as a buffer for temporarily saving an image of a real space area repeatedly acquired by the image acquisition unit 304. The desired image can be information used for subsequent processing, for example, in which a viewing confirmation request is sent by using desired-image information.

The feature-point extracting unit 308 extracts, from an image of a real space area acquired by the image acquisition unit 304 and a template image, feature points (key points) that are points indicating local feature quantities in the images. The extraction of feature points can be realized by using an ORB (Oriented FAST and Rotated BRIEF) algorithm, for example. The feature-point position determining unit 309 determines the positions of feature points in the case where the reference image is placed inside a predetermined region of an image of a real space area to be acquired by the image acquisition unit. The positions of the feature points can be identified by coordinate information x, y indicating the coordinates in the image, for example.

The feature-point distance calculating unit 310 repeatedly calculates feature-point distances. Specifically, the feature-point distance calculating unit 310 obtains an image of a space acquired by the image acquisition unit 304, detects points corresponding to feature points in the reference image from the image of the space acquired by the image acquisition unit 304, and calculates the distances between the positions of the detected points corresponding to the feature points in the reference image and the determined positions of the feature points corresponding to the detected points, in a repeated manner.

The judgment unit 311 judges whether the amount of movement of the electronic device is equal to or less than a predetermined allowable reference value, on the basis of the amount of change in at least one sensor value obtained from the sensor unit 305 and the calculated distances. If it is judged that the amount of movement of the electronic device is equal to or less than the allowable reference value, the control unit 301 obtains the image of the space acquired by the image acquisition unit 304 and stores the image of the space in the storage unit as a desired image.

The reference-image determining unit 312 selects one template image from two or more template images that are target-object images stored in the storage unit 306 and determines the template image as a reference image. The reference-image determining unit 312 acquires an image of a space by using the image acquisition unit 304, detects points corresponding to feature points in the selected one template image, from the image of the space acquired by using the image acquisition unit 304, and determines the selected template image as a reference image in the case where the number of detected points corresponding to the feature points is equal to or greater than a predetermined reference value. Feature points in a template image may be detected in advance and stored in the storage unit 306 together with information indicating the feature points, or may be detected after the template image is read from the storage unit 306 and before any processing or each processing is executed.

Figure 4:
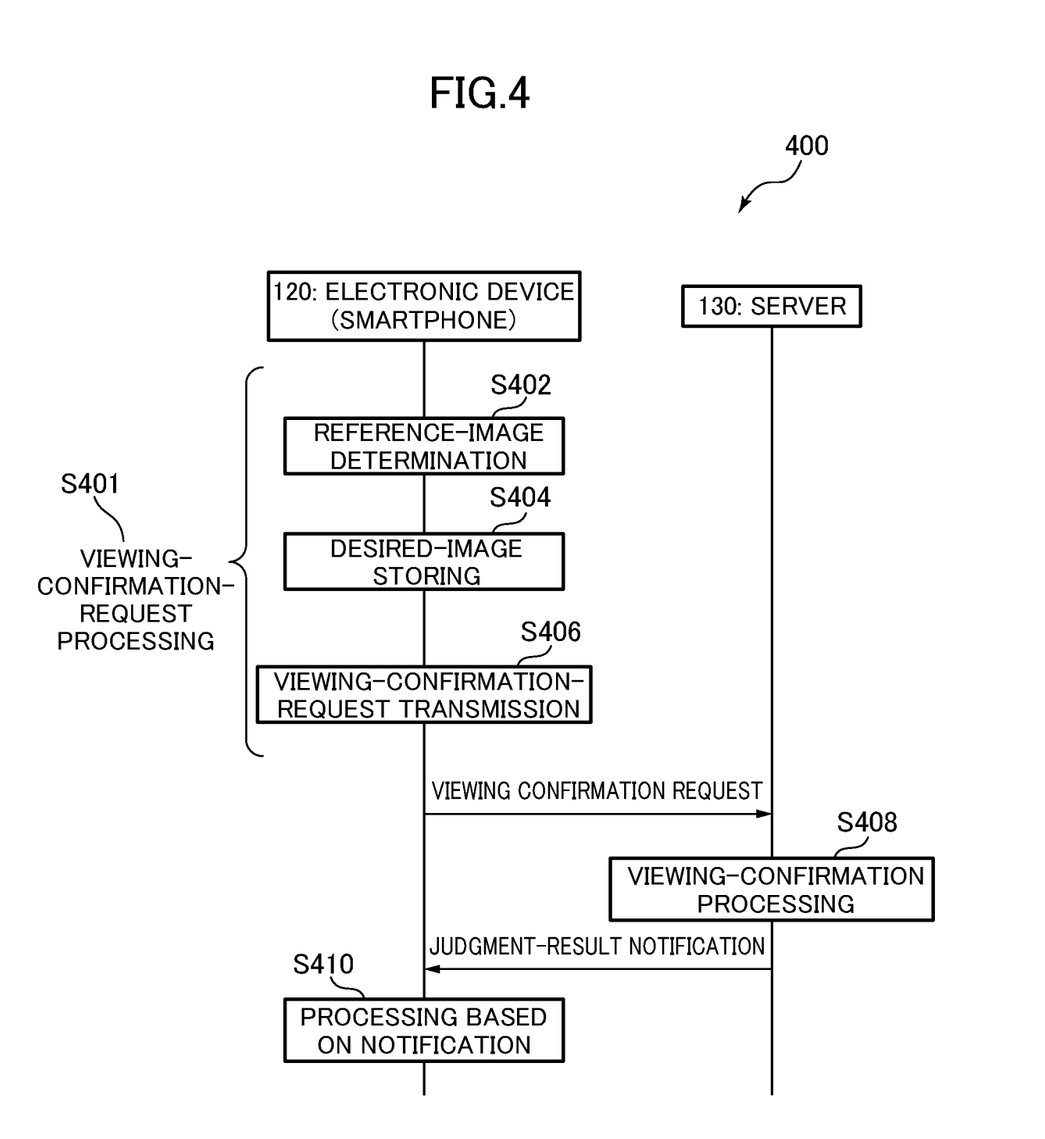
FIG. 4 is a flowchart showing information processing according to the embodiment of the present invention.

Next, FIG. 4 shows a flowchart of operations at the electronic device 120 and the server 130 in this embodiment. In this embodiment, a description will be given of an example case in which the user of the smartphone, which serves as the electronic device 120, is required to view a posted notice (poster), serving as a target object, posted at a predetermined spot, in order to obtain an item to be used in an online game that the user plays; however, the present invention can be used for any system as long as the system uses a target-object image acquired with the electronic device 120 being stabilized by using a known image.

In this embodiment, for viewing confirmation, the user visits a posting spot where the posted notice is posted, acquires an image of the posted notice, and sends a viewing confirmation request including the acquired image to the server, and the server performs authenticity judgment for judging whether the acquired image is not an image acquired by another person, thus confirming the legitimacy of the viewing request. Here, the user is required to acquire an image, for viewing confirmation, by including, therein, the posted notice and a peripheral area of the posted notice. Accordingly, the accuracy of detection of an illegitimate viewing confirmation request can be enhanced. This is because a peripheral image acquired together with the image of the posted notice changes every time image acquisition is performed, depending on the acquisition time, the angle, etc., whereby the possibility of acquiring exactly the same image is very low. Although there is a known technique of confirming that the user has visited the posting spot, where the posted notice is posted, by using location information on a smartphone, it is difficult to detect illegitimacy of disguising the GPS values of a posted-notice image obtained at home or the like from a website. By using this embodiment, an illegitimate check-in through falsification of the location information can be effectively prevented.

After the image is certificated as a legitimate viewing image at the server, it is recognized that the user actually visited the spot and viewed the poster, and an item is distributed with respect to a game account of the user. In this embodiment, although the posted notice is a poster printed on paper, a display device, such as a liquid crystal panel, or a signboard may be used as long as the display device or the signboard is used to post information etc.

First, in this embodiment, the user downloads and installs the viewing confirmation application, as a program 209, in the electronic device 120, visits a predetermined posting spot, and views a poster. When the user activates the viewing confirmation application in the electronic device 120 in order to acquire an image of the poster, the electronic device 120 executes viewing-confirmation-request processing (S401).

The viewing-confirmation-request processing (S401) includes reference-image determining processing (S402), desired-image storing processing (S404), and viewing-confirmation-request transmitting processing (S406). In the reference-image determining processing (S402), one template image selected from two or more template images, which are target-object images, stored in the storage unit 306 is determined as a reference image. In the case where there are a plurality of kinds of posted notices posted at a predetermined spot, it is preferred to identify the posted notice of which the user attempts to acquire an image. In that case, images of the plurality of posted notices posted at the predetermined spot are stored in the storage unit as template images in advance, and, from among the template images, the template image corresponding to an image the user attempts to acquire is determined as a reference image.

For example, in the case where a posted notice is uniquely identified as in the case where there is only one posted notice, the reference-image determining processing can be omitted. Furthermore, in the case where posted notices are posted at a plurality of spots, it is also possible to store, in the storage unit 306, template images in such a manner as to be linked with location information, to identify the location of the electronic device 120 by using a GPS sensor or the like, to select the template image corresponding to an image that may be acquired, on the basis of the identified location information, and to determine the reference image from the selected template image.

In the desired-image storing processing (S404), an acquired image when the amount of movement of the electronic device satisfies a predetermined permissible level is stored as a desired image, on the basis of the reference image and sensor values obtained from the sensor unit 305 of the electronic device 120. Then, in the viewing-confirmation-request transmitting processing (S406), a viewing request including the stored desired image is sent to the server 130.

Figure 5:
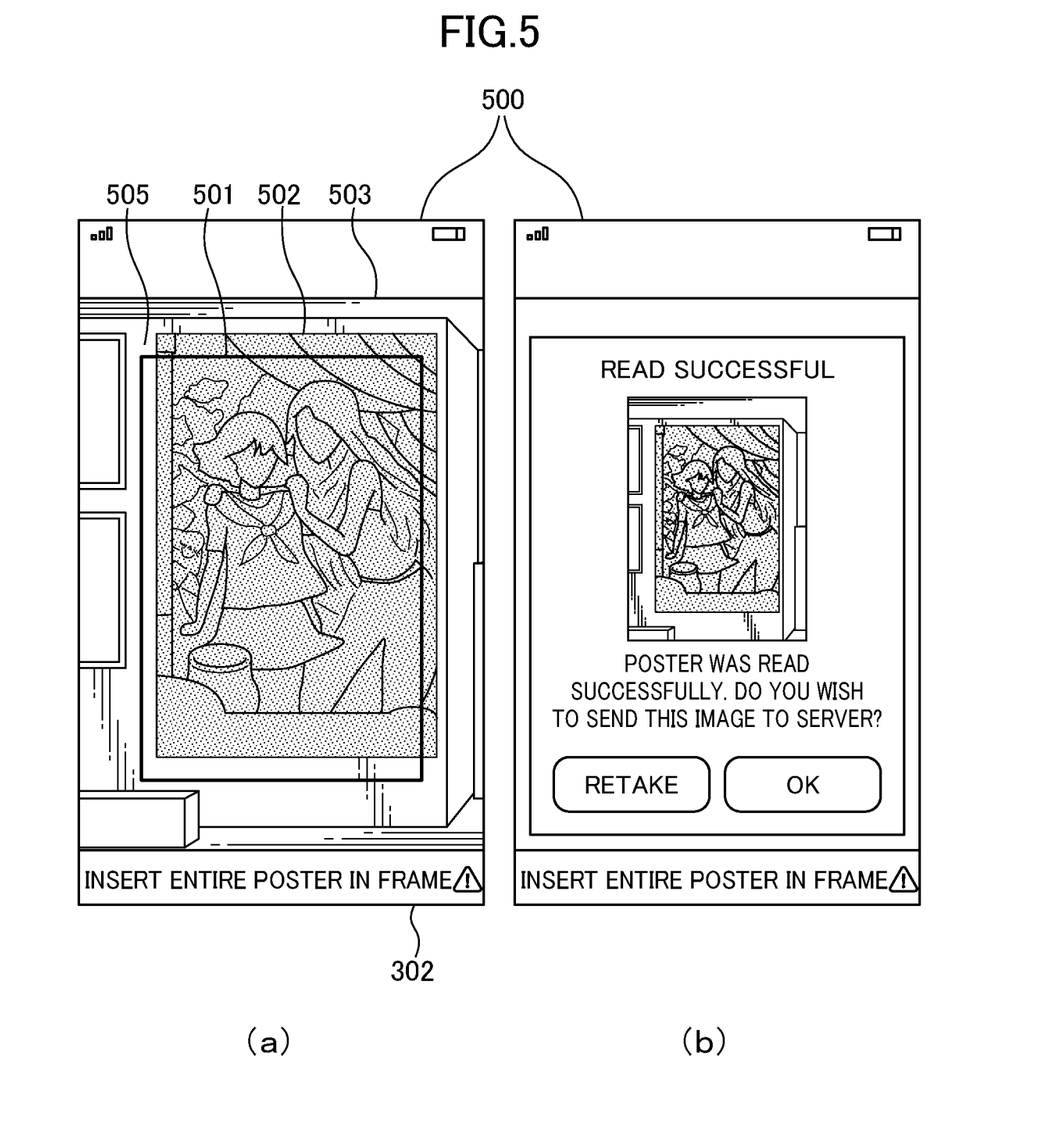
FIG. 5 is a view showing a screen display example according to the embodiment of the present invention.

FIG. 5 shows a display screen 500 of the viewing confirmation application displayed on the display unit 302, according to one Example. As shown in FIG. 5(a), the display unit 302 displays an image of a space acquired by the image acquisition unit 304, a frame 501 indicating a predetermined region inside which a poster 502 should be included, and a message instructing the user to include the entire poster inside the frame. Here, an entire image-acquisition region 503 of the image acquisition unit 304 is displayed on the display unit 302, and the frame 501 has a smaller region than the entire image-acquisition region. Thus, when the poster 502 is included inside the frame 501, a peripheral image 505 of the poster 502 is displayed in an outer region of the frame 501. By being instructed to include the poster inside the frame 501, the user moves the electronic device 120. Accordingly, it is possible to obtain an acquired image including a peripheral image from a certain distance and angle. The certain distance and angle do not have to be strictly constant. The distance and angle just need to fall within ranges in which it is judged that a predetermined condition, to be described later, for acquiring a desired image is satisfied.

In the present invention, the target object, which is a poster, is not necessarily included exactly inside the frame 501 in a desired image. In the desired-image storing processing (S404), to be described in detail later, when it is judged that the predetermined condition is satisfied, an acquired image is set as a desired image. Preferably, image acquisition is performed when the poster, which is a target object, is included in the vicinity region of the frame 501, which is superimposed with the region where the reference image is placed. The user can use the frame 501 as a guide for satisfying this requirement.

The server 130 receives the viewing confirmation request and executes viewing-confirmation processing (S408). In the viewing-confirmation processing, the server 130 judges whether viewing by the user is illegitimate. In the case where the user makes a viewing confirmation request while pretending that the user visited the posting spot even though the user did not actually visit the posting spot, this viewing is judged to be illegitimate. In the case where the user makes a viewing confirmation request after the user actually visited a spot where a posted notice is posted and viewed the posted notice, this viewing is judged to be legitimate. The server 130 performs processing based on the result of judgment as to whether the viewing is illegitimate.

After the viewing-confirmation processing (S408) is executed, the server 130 sends a judgment-result notification to the electronic device 120 on the basis of the judgment result, and the electronic device 120 may execute notification-based processing (S410). For example, if the judgment result indicates that the viewing is legitimate, the server 130 executes processing for privilege assignment on the basis of the user ID with respect to the user who has sent the viewing image, and sends information indicating that the privilege assignment has been executed, as a judgment-result notification, and the electronic device 120 displays this information on the display unit of the electronic device to be able to make a notification to the user. The judgment-result notification processing is not always necessary. For example, it is also possible to perform only the privilege assignment processing at the server and not to perform notification of privilege assignment, or it is also possible to perform only account suspension processing with respect to the user in the case where the judgment result indicates that the viewing is illegitimate. The viewing-confirmation processing (S408) and the notification-based processing (S410) may be any processing as long as processing in which viewing confirmation can be performed and processing based on a notification can be executed.

Figure 6:
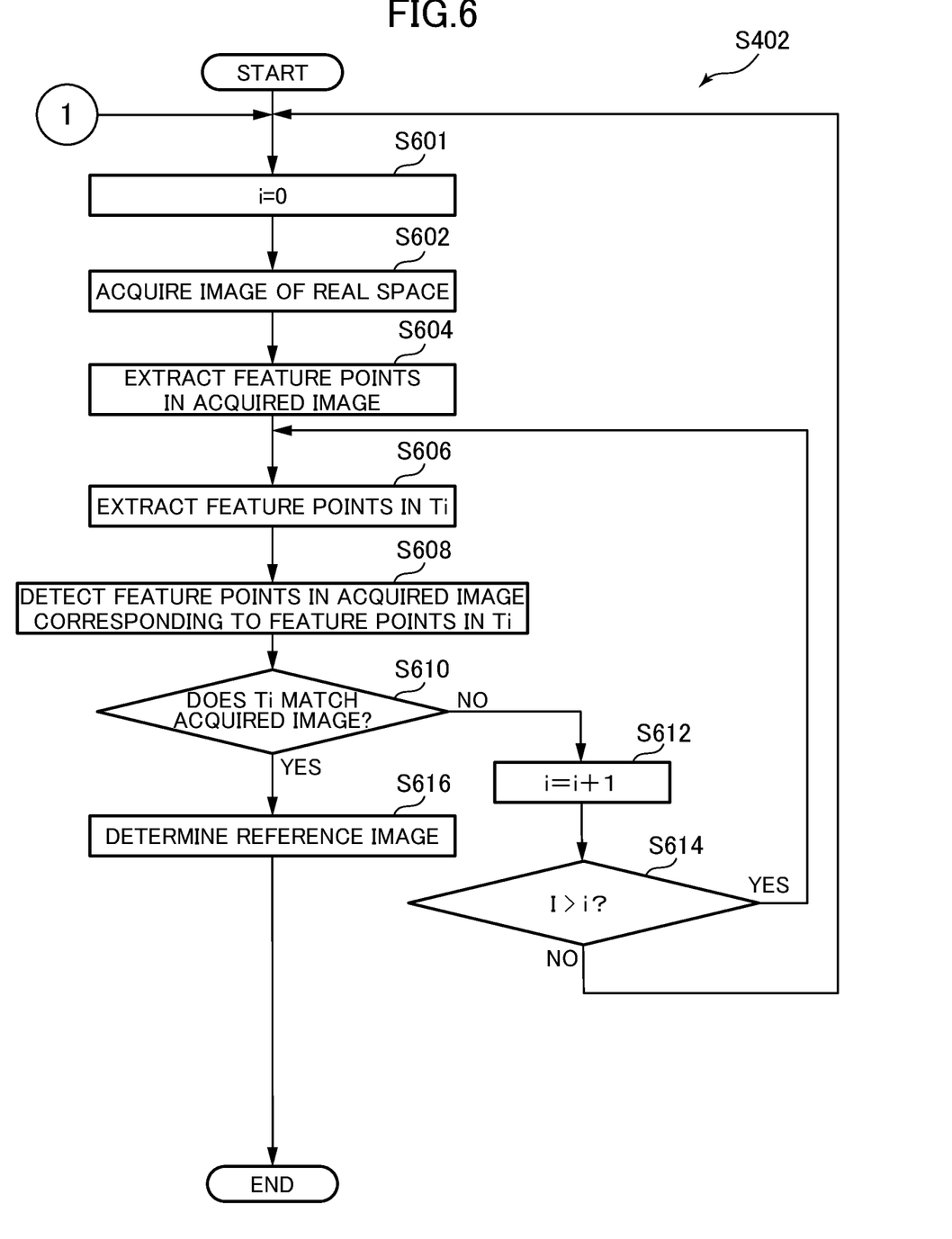
FIG. 6 is a flowchart showing information processing according to the embodiment of the present invention.

Next, FIG. 6 shows more specific processing content of the reference-image determining processing (S402) in this embodiment. When the user activates the viewing confirmation application at the electronic device 120, the electronic device 120 resets a counter i for the template images to 0 (S601), activates the image acquisition unit 304, and starts to acquire images of a real space area (S602). Although image acquisition of the image acquisition unit 304 can be generally performed at about 30 frames per second or 60 frames per second, in this embodiment, it is assumed that calculation of feature quantities using an ORB algorithm is performed at frequency of 5 times per second, and the real-space image acquisition in S602 is performed by capturing frames at 5 frames per second from frames acquired by the image acquisition unit.

After an image in one frame is acquired in S602, extraction processing for extracting feature points from the acquired image is performed (S604). It is assumed that an ORB (Oriented FAST and Rotated BRIEF) algorithm is used to extract feature points. Here, it is assumed that four template images ($T_0$ to $T_3$) are stored in the storage unit 306. The reference-image determining unit 312 reads the template image $T_0$ from the storage unit 306 and executes extraction processing for extracting feature points therefrom (S606). If template images that include information on feature points are stored in advance in the storage unit 306, the feature-point extraction processing can be omitted.

Next, feature points in the acquired image that correspond to the feature points in the template image $T_0$ are detected (S608). This detection can be realized by using, for example, a key-point matching technology using ORB (Oriented FAST and Rotated BRIEF) feature quantities. Then, it is judged whether the template image $T_0$ matches the acquired image (S610). That is, it is judged whether the template image $T_0$ corresponds to a target-object image the user attempts to acquire. Specifically, if the number of feature points in the acquired image that correspond to the feature points in the template image $T_0$, the feature points in the acquired image being detected in S608, exceeds a predetermined reference value (threshold), it is judged that the template image $T_0$ matches the acquired image. The predetermined reference value can be, for example, 3% of the total number of feature points detected in the reference image.

If it is judged that the template image $T_0$ does not match the acquired image, the counter i is incremented (S612). If the counter i is less than the number of templates, that is, 4, stored in the storage unit (S614), the next template image $T_1$ is read from the storage unit 306, and the processing from S606 to S614 is repeatedly executed. In the case where the processing from S606 to S610 has been executed for all the template images, the counter i is reset (S601), and the processing from S604 to S614 is repeatedly executed on the basis of an image in a frame next acquired, until a reference image is determined.

In the case where it is judged in S610 that the template image $T_i$ matches the acquired image, the template image $T_i$, which is judged to match the acquired image, is determined as a reference image (S616).

Figure 7:
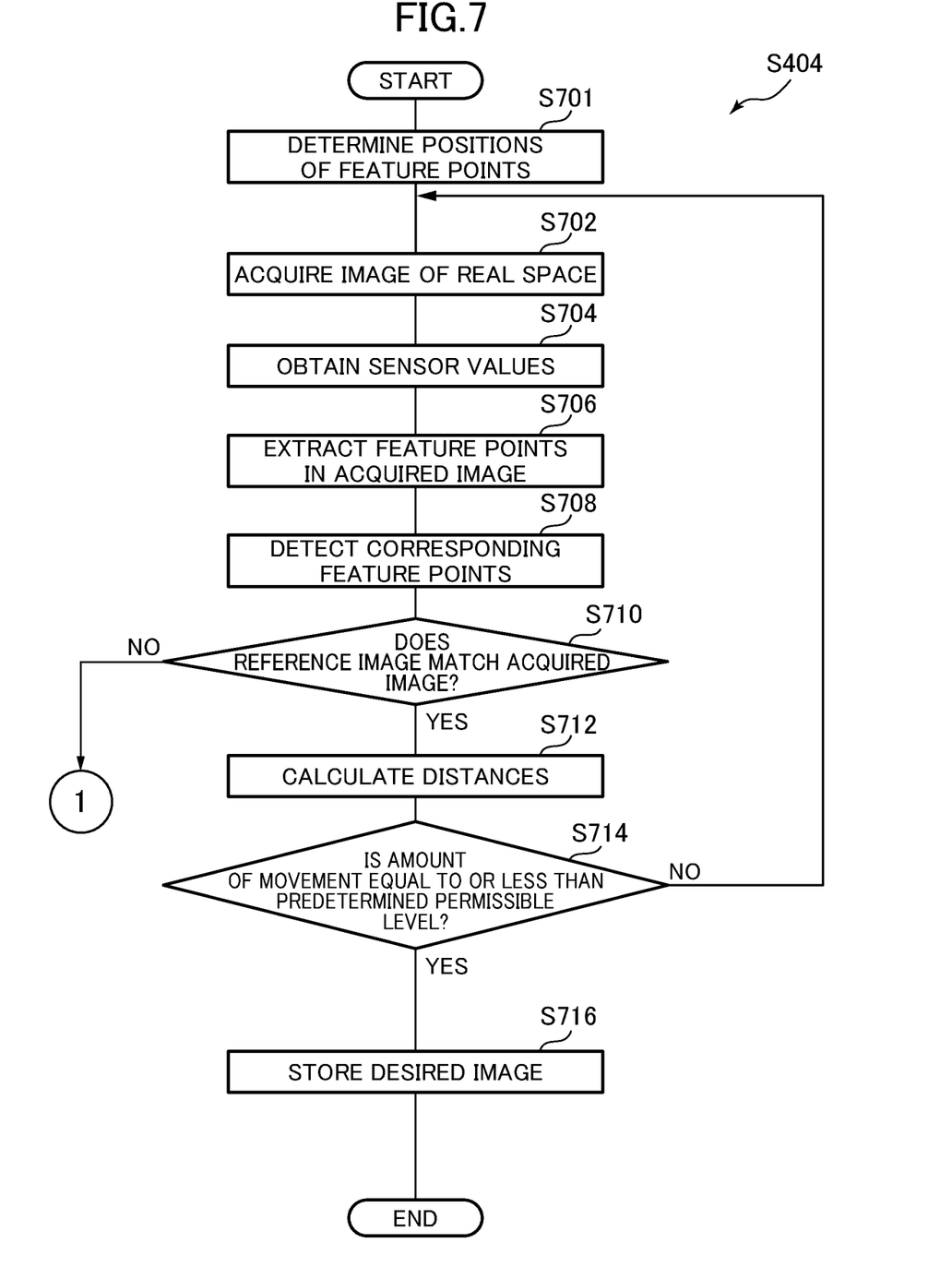
FIG. 7 is a flowchart showing information processing according to the embodiment of the present invention.

After the reference-image determining processing (S402) is finished, the desired-image storing processing (S404) is executed. FIG. 7 shows more specific processing content of the desired-image processing (S404) in this embodiment. At the electronic device 120, the feature-point position determining unit 309 determines the positions of feature points in the case where the reference image is placed inside the predetermined region of an image of a space to be acquired by the image acquisition unit 304 (S701). Here, it is assumed that the positions of feature points are identified by coordinate information x, y that indicates the coordinates in the acquired image.

Next, as in S602, acquisition of an image of a real space area is executed by using the image acquisition unit 304 (S702). Furthermore, sensor values are obtained from the sensor unit 305 (S704) and are stored in the storage unit 306, which functions as a buffer. In this embodiment, as described above, it is assumed that the image acquisition unit 304 performs image acquisition on a real space area, which is accompanied by calculation of ORB feature quantities, at 5 times per second. Meanwhile, measurement of sensor values can be executed at the sensor unit at about 100 times per second. Therefore, image acquisition is performed at 5 times per second (S702), and, in S704, where sensor values are obtained, measurements executed 20 times at the sensor unit, for example, can be stored in the storage unit 306. Alternatively, on the assumption that the processing for obtaining sensor values is executed in parallel with the desired-image storing processing, sensor values may be sequentially stored in the storage unit 306 every time the sensor values are measured at the sensor unit 305.

In this embodiment, although the sensor unit 305 measures and outputs 9-axis values along three gyro axes, three acceleration axes, and three orientation axes, the same effect can be obtained even when any one or two combinations of the three gyro axes, the three acceleration axes, and the three orientation axes are used. Furthermore, the sensors do not need to have three axes each. In the processing performed immediately after the reference-image determining processing, S702 can be omitted by using the image of the real space acquired in the reference-image determining processing.

Next, as in the processing in S604 to S610, extraction processing for extracting feature points from the acquired image acquired in S702 is performed (S704), feature points in the acquired image that correspond to the feature points in the reference image are extracted (S708), and it is judged whether the reference image matches the acquired image (S710). The judgment as to whether the reference image matches the acquired image can be performed on the basis of whether the number of detected feature points in the acquired image that correspond to the feature points in the reference image is equal to or greater than a predetermined value. The predetermined value used here may be set to a threshold lower than the threshold used in the reference-image determining processing. By using a threshold lower than that in the reference-image determining processing, it is possible to prevent the flow from frequently returning to the reference-image determining processing.

In this embodiment, if it is judged that the reference image does not match the acquired image, the flow returns to the reference-image determining processing (S402). In the case where determination of the reference image was not correct, or the user has changed the posted notice of which an image is to be acquired, it is possible to select a new appropriate reference image from the template images. Alternatively, in the case where the number of detected feature points is equal to or less than the predetermined value for a predetermined period of time or longer, the flow may return to the reference-image determining processing (S401). If S708 and S710 are omitted, and a reference image is determined, the desired-image storing processing may be continued until a desired image is obtained on the basis of that reference image.

If it is judged in S710 that the reference image matches the acquired image, the distances between the positions of the detected points corresponding to the feature points in the reference image and the determined positions of the feature points corresponding to the detected points are calculated (S712). The distance "distance(p,p')" between a set p of the feature points in the reference image and a set p' of the corresponding feature points in the acquired images can be defined as follows.

$$\text{distance}(p, p') := \frac{\sum_{i=0}^{n-1} \sqrt{(x(p_i) - x(p'_i))^2 + (y(p_i) - y(p'_i))^2}}{n} \quad \{\text{Formula 1}\}$$

Here, $x(p_i)$ indicates the x coordinate at an i-th feature point, and $y(p_i)$ indicates the y coordinate at the i-th feature point. In this formula, the average value of distances for all feature points is calculated as the distance. In a different embodiment, it is also possible to adopt a method for calculating the maximum value of the distances or a method for calculating the median of the distances or another statistic of a combination of these values.

In S714, it is judged whether the amount of movement of the electronic device 120 is equal to or less than the predetermined permissible level. In this embodiment, the judgment as to whether the amount of movement is equal to or less than the predetermined permissible level is performed on the basis of the amount of change in sensor value obtained from the sensor unit and the calculated distances. In order to calculate the amount of change in sensor value, a plurality of sensor values obtained at two or more timings, preferably, during a predetermined period of time, are required. Therefore, in S714, in the case where the required number of sensor values has not been obtained, it is assumed that the amount of movement does not satisfy the predetermined permissible level, the flow returns to S702, acquisition of sensor values and calculation of the distances are repeatedly executed until the required number of items of data is obtained, and the obtained data is stored in the storage unit 306, which functions as a buffer. An example of data D to be stored in the storage unit 306, which functions as a buffer, is shown below.

$$D := \{\text{bitmap}, id, x, y, h, w, [S_0, \ldots, S_{n-1}], [P_0, \ldots, P_{m-1}]\} \quad \{\text{Formula 2}\}$$

$$S_i := \{x_i, y_i, z_i, a_i, b_i, g_i, \alpha_i, \beta_i, \gamma_i\} \quad \{\text{Formula 3}\}$$

$$P_i := \{p_{i\_0}, \ldots, p_{i_{Q-1}}\} \quad \{\text{Formula 4}\}$$

The data D has a data structure so as to store, for M seconds at most, five items of data, i.e., bitmap data "bitmap" of a reference image, the identifier linked with the reference image, "x, y, h, w" indicating placement information on the reference image placed in an image acquired, sensor-value information S for a predetermined period of time obtained from the sensor, and information P indicating the positions of feature points in the image. The data D is stored in the buffer of the storage unit 306. In the buffer, data may be overwritten starting from the oldest data, as in a ring buffer.

The placement information includes the coordinates (x, y) of the lower left end of a portion in the acquired image where the reference image is placed, and the width (w) and the height (h) of a poster part. $[S_0, \ldots, S_{n-1}]$ indicates n groups of sensor values measured for M seconds, and $S_i$ indicates an i-th sensor value. In this embodiment, the sensor value $S_i$ includes sensor values along the three gyro axes $(x_i, y_i, z_i)$, the three acceleration axes $(a_i, b_i, g_i)$, and the three orientation axes $(\alpha_i, \beta_i, \gamma_i)$. $[P_0, \ldots, P_{m-1}]$ indicates position information on feature points in m frames, measured for M seconds, and $P_i$ indicates position information on Q feature points in an i-th frame. It is assumed that position information on one feature point p includes coordinate information x, y on that feature point. Examples of historical information of the sensor values and the position information on feature points, which are stored in the data buffer, are shown below.

TABLE 1

| Timestamp | accelerometer (x) | accelerometer (y) | accelerometer (z) |
|---|---|---|---|
| 1498798577 | 0.5 | 0.2 | 0.1 |
| 1498798578 | 0.4 | 1.2 | 0.5 |
| 1498798579 | 0.6 | 1.4 | 0.4 |
| ... | ... | ... | ... |
| 1498800600 | 0.5 | 0.2 | 0.1 |

TABLE 2

| Timestamp | gyro (a) | gyro (b) | gyro (g) |
|---|---|---|---|
| 1498798577 | 0.3 | 0.1 | 0.11 |
| 1498798578 | 2.1 | 0.9 | 0.01 |
| 1498798579 | 2.2 | 1.1 | 0.03 |
| ... | ... | ... | ... |
| 1498800600 | 0.3 | 0.1 | 0.11 |

TABLE 3

| Timestamp | orientation (α) | orientation (β) | orientation (γ) |
|---|---|---|---|
| 1498798577 | 0.8 | 0.3 | 0.4 |
| 1498798578 | 3.5 | 1.2 | 0.5 |
| 1498798579 | 3.3 | 1.0 | 0.9 |
| ... | ... | ... | ... |
| 1498800600 | 0.5 | 0.15 | 0.2 |

TABLE 4

| Timestamp | feature_point_1 | feature_point2 | ... | feature_point_x |
|---|---|---|---|---|
| 1498798500 | (x = 100, y = 120) | (x = 300, y = 320) | ... | (x, y) |
| 1498798800 | (x = 101, y = 120) | (x = 301, y = 320) | ... | (x, y) |
| 1498799100 | (x = 198, y = 120) | (x = 304, y = 320) | ... | (x, y) |
| ... | ... | ... | ... | ... |
| 1498800600 | (x = 99, y = 121) | (x = 299, y = 321) | ... | (x, y) |

Table 1 to Table 3 respectively show historical data of sensor values from an acceleration sensor, a gyro sensor, and an orientation sensor during a predetermined period of time. Table 4 shows historical data of the coordinates of individual feature points in each acquired image. The amount of change in sensor value can be calculated on the basis of the difference between sensor values adjacent in time measured during the predetermined period of time. The total value of the absolute values of the calculated differences can be set as one reference used to judge the amount of movement. Timestamp indicates the time of measurement, and the larger the Timestamp value, the newer the measured values.

For example, in Table 1, values with Timestamp of 1498798577 and 1498798578 from the accelerometer (x) are 0.5 and 0.4, respectively, and thus, the absolute value of the difference therebetween is 0.1. Similarly, the differences between values with Timestamp of 1498798577 and 1498798578 from the accelerometer (y) and the accelerometer (z) are calculated. That is, these differences are 0.8 and 0.4. The sensor values next adjacent in time are values with Timestamp of 1498798578 and 1498798579, and the absolute values of the differences between those values from the accelerometer (x), those values from the accelerometer (y), and those values from the accelerometer (z) are 0.2, 0.2, and 0.1. If the period from 1498798577 to 1498798579 in Timestamp is the predetermined period of time, the total value of these calculated differences, i.e., 1.8, is obtained.

As for the feature points, the distances between the feature points in the reference image and the corresponding feature points, in an acquired image, to which one Timestamp is assigned are calculated on the basis of Formula 1, which is mentioned above. In this embodiment, although the average value of the distances is calculated as the distance and is used to judge the amount of movement, it is also possible to use the maximum value or the median of the distances or a combination of these values as a statistic. The statistic of the distances may be a statistic of the distances with respect to feature points to which a plurality of Timestamps are assigned. It is assumed that the distances are normalized to [0, 1] by the width of an acquired image.

Furthermore, in one modification, the distance difference between distances in images acquired during a predetermined period of time may be used as a statistic of the distances. For example, in the case where the average value of the distances at a Timestamp of 1498798500 is 0.05, and the average value of the distances at a Timestamp of 1498798800 is 0.03, the distance difference is 0.02. The differences between the average values of the distances calculated on the basis of position information on feature points to which adjacent Timestamps within the predetermined period of time are assigned are all calculated, and the total value of the differences is obtained as the statistic of the distances.

Then, when a state in which the total value related to the sensor values is equal to or less than a predetermined value and in which the statistic of the distances is equal to or less than a predetermined value lasts for a predetermined period of time, it is assumed that the amount of movement satisfies the predetermined permissible level. For example, when a state in which the average value of the distances is equal to or less than 0.1 and in which the total of the amounts of change in sensor value is equal to or less than 2.0 lasts for 0.5 seconds, it is judged that the amount of movement satisfies the predetermined permissible level.

The sensors of the electronic device 120, such as the gyro sensor, the acceleration sensor, and the orientation sensor, can monitor movement and rotation at 100 times per second, thus making it possible to detect a sudden movement of the electronic device 120. Meanwhile, it is difficult to respond to a change caused by a subtle change in angle, etc., because these sensors capture only the movement of the hand(s) of the user. In this embodiment, in addition to these sensors, the distances between feature points in the reference image and those in an acquired image are used to judge the amount of movement. Since the movements of feature points in an acquired image correspond to movements obtained by enlarging the movement of the smartphone, subtle smartphone shake can be detected. Since the ORB feature quantities are calculated only at a frequency of 5 times per second, detection of a sudden movement is difficult. Thus, the sensor values, which are measured using the sensors, such as the acceleration sensor etc., and the distances between feature points are both used, thereby making it possible to automatically detect a stable state in which neither a sudden movement nor a subtle movement occurs, to enable acquisition of a high-quality image.

Furthermore, it is also possible to set a requirement that the number of detected corresponding feature points is equal to or greater than a predetermined value. For example, it is also possible to set a requirement that the number of feature points corresponding to 15% or more of the total number of feature points in the reference image is detected in an acquired image. The amount of movement is judged on the basis of a sufficient number of feature points, thereby enabling acquisition of a higher quality image.

In the case where it is judged that the amount of movement does not satisfy the predetermined permissible level, the flow returns to S702.

In the case where it is judged that the amount of movement satisfies the predetermined permissible level, the image of the space acquired by the image acquisition unit is stored in the storage unit 306 as a desired image in S716, and the desired-image storing processing (S404) ends. The image stored in the storage unit 306 as a desired image is the image already acquired in S702, can be one acquired image used to judge whether the amount of movement satisfies the predetermined permissible level, and, preferably, can be the image acquired last and stored in the storage unit 306, which functions as a buffer. Furthermore, an image acquired by the image acquisition unit 304 within a predetermined period of time immediately after it is judged that the amount of movement is equal to or less than the predetermined permissible level may also be set as a desired image.

When the desired-image storing step S404 ends, the electronic device 120 sends a viewing confirmation request to the server 130 in S406. In addition to the desired image, information on the obtained sensor values and feature points can be included in the viewing confirmation request. Since the information on the sensor values and the feature points is considered to be unique for each viewing request, the information can be used to judge the legitimacy of a viewing request at the server 130. That is, while there is a possibility that the desired image will be similar to an image acquired by another user, a possibility that the information on the sensor values and the feature points, which is data indicating the history of movement of the electronic device 120 when the desired image is acquired, will match other such information is extremely low. Therefore, the information can be used as signature information unique to each image acquisition.

By using this embodiment, it becomes possible to acquire an image including a target-object image in a state in which the electronic device 120 is stabilized, without using an additional device, and to prevent a reduction in image quality, such as image distortion with blur caused by camera shake or the like. By using this embodiment, more-reliable authenticity judgment of an acquired image can be performed. The sensor values, which are measured using the sensors, such as the acceleration sensor etc., and the distances between feature points are both used, thereby making it possible to automatically detect a stable state in which neither a sudden movement nor a subtle movement occurs, to enable acquisition of a high-quality image.

When the user moves the electronic device 120 in order to acquire an image that includes a target object inside the predetermined region, where the reference image is placed, of the acquired image, for example, inside the region indicated by the frame 501, and acquires the image at the moment at which the target object is included inside the frame 501, the quality of the acquired image tends to be low due to camera shake or the like because the image is acquired while the electronic device 120 is being moved a lot. This movement can reduce particularly the accuracy of authenticity judgment for checking-in etc. By using this embodiment, even in the case where the user moves the electronic device 120 in order to attempt to acquire an image that includes a target object inside the predetermined region, where the reference image is placed, of the acquired image, a desired image is stored after the electronic device 120 is stopped moving and becomes stable, whereby it is possible to acquire a high-quality image that includes a peripheral image from a certain angle and distance.

Figure 8:
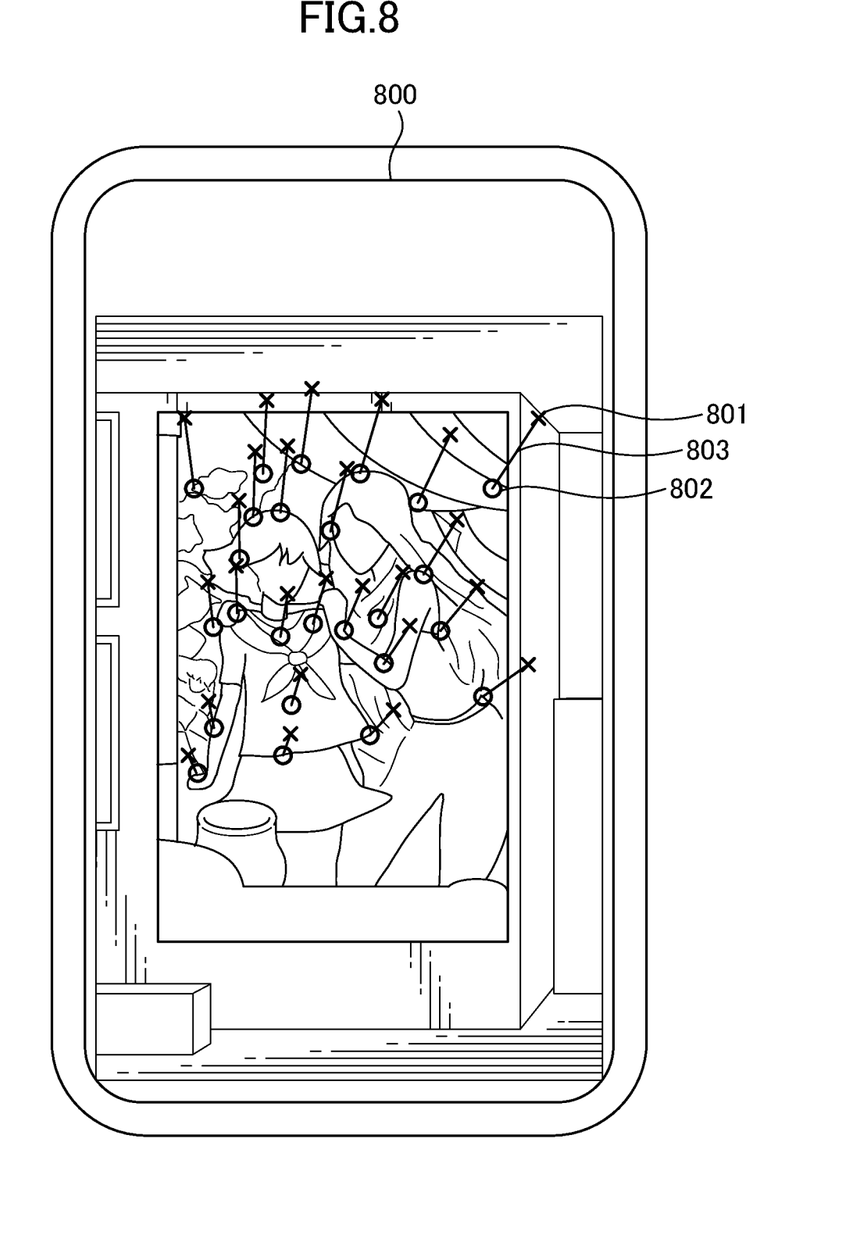
FIG. 8 is a view showing a screen display example according to the embodiment of the present invention.

Furthermore, in one modification, instead of the frame 501 in the display screen 500 of the viewing confirmation application, which is shown in FIG. 5, or in addition to the frame 501, it is possible to draw and display corresponding line segments that connect feature points in the reference image on an acquired image and corresponding feature points detected in the acquired image. FIG. 8 shows an example display screen 800 in the case in which corresponding line segments are drawn, instead of the frame 501. Points indicated by cross marks are the positions of feature points 801 in the reference image, and points 802 indicated by circle marks are the positions of corresponding feature points in an acquired image. The positions of the corresponding feature points are connected with corresponding line segments 803, thereby making it possible to make the user easily understand the direction and the distance in which the electronic device 120 should be moved. Various sensor values may also be displayed in the display screen 800. The amount of movement of the electronic device 120 can also be used as guide information for the user to stabilize the electronic device 120.

The processing or operation described above can be modified freely as long as no inconsistency arises in the processing or operation. Furthermore, the embodiment described above is an example for explaining the present invention, and the present invention is not limited to this embodiment. The present invention can be embodied in various forms as long as there is no departure from the gist thereof. Furthermore, the advantageous effects described in this embodiment are just examples of most preferable effects derived from the present invention, and the advantageous effects of the present invention are not limited to those described in this embodiment.

REFERENCE SIGNS LIST

100: system
110: network
120: electronic device
130: server
201: processor
202: display device
203: input device
204: image acquisition device
205: sensor
206: storage device
207: communication device
208: bus
209: program
251: processor
252: display device
253: input device
254: storage device
255: communication device
256: program
258: bus
301: control unit
302: display unit
303: input unit
304: image acquisition unit
305: sensor unit
306: storage unit 307: communication unit
308: feature-point extracting unit
309: feature-point position determining unit
310: feature-point distance calculating unit
311: judgment unit
312: reference-image determining unit
351: control unit
352: display unit
353: input unit
354: storage unit
355: communication unit
500: display screen
800: display screen

The invention claimed is:

1. A method comprising:
a step of determining a plurality of determined positions of a plurality of feature points indicating local feature quantities in a reference image in response to the reference image being placed inside a predetermined region of an image of a space to be acquired by an image acquisition unit of an electronic device,
wherein the electronic device acquires an image comprising one or more surroundings of a target object, and
wherein the electronic device comprises at least one sensor from among a gyro sensor, an acceleration sensor, and an orientation sensor, the image acquisition unit, and a storage unit for storing the reference image that is an image of the target object;
a calculating step of repeatedly calculating a plurality of feature-point distances, the calculating step repeatedly executing a plurality of steps comprising:
a step of acquiring an image of the space using the image acquisition unit,
a step of detecting, from the image of the space acquired by the image acquisition unit, a plurality of detected points corresponding to the plurality of feature points in the reference image, and
a step of calculating the plurality of feature-point distances between the plurality of determined positions of the plurality of detected points corresponding to the plurality of feature points in the reference image and the plurality of determined positions of the plurality of feature points corresponding to the plurality of detected points;
a judgment step of judging whether an amount of movement of the electronic device is equal to or less than a predetermined allowable reference value, based on an amount of change in a sensor value obtained from the at least one sensor and the plurality of feature-point distances;
an image storing step of storing the image of the space, which is acquired by the image acquisition unit, in the storage unit as a desired image in response to the image of the space being judged that the amount of movement of the electronic device is equal to or less than the predetermined allowable reference value; and
a judgment step for performing an authenticity judgment based on the desired image,
wherein the authenticity judgment determines whether the desired image is not an image acquired by a person different from a user of the electronic device.

2. The method according to claim 1, wherein, in the calculating step of calculating the plurality of feature-point distances, a statistic of the plurality of feature-point distances is calculated between the plurality of determined positions of the plurality of detected points corresponding to the plurality of feature points in the reference image and the plurality of determined positions of the plurality of feature points.

3. The method according to claim 2, wherein the statistic of the plurality of feature-point distances is a statistic of a plurality of distance differences between a plurality of repeatedly calculated distances.

4. The method according to claim 2, wherein judging whether the amount of movement of the electronic device comprises judging that the amount of movement of the electronic device is equal to or less than the predetermined allowable reference value based on a total of the amounts of change in the sensor value during a predetermined period of time is equal to or less than a predetermined sensor-value-change threshold and the statistic of the plurality of feature-point distances is equal to or less than a predetermined distance threshold.

5. The method according to claim 1, wherein the image storing step is executed in response to a number of the plurality of feature points being detected in the image of the space is equal to or greater than a predetermined number.

6. The method according to claim 1,
wherein the storage unit stores two or more template images for a plurality of target-object images, and a second reference image is one template image determined from among the two or more template images, and
wherein the method further comprises:
a step of selecting one template image from among the two or more template images;
a step of acquiring a second image of the space using the image acquisition unit;
a step of detecting, from the second image of the space acquired by the image acquisition unit, a second plurality of detected points corresponding to a second plurality of feature points in the selected one template image; and
a step of determining the selected one template image as the second reference image in response to a number of the second plurality of detected points corresponding to the second plurality of feature points is equal to or greater than a predetermined reference value.

7. The method according to claim 1, further comprising a step of displaying the image of the space acquired by the image acquisition unit on a display unit of the electronic device, wherein the image of the space is displayed with a plurality of lines connecting the plurality of determined positions of the plurality of feature points to the plurality of determined positions of the plurality of detected points corresponding to the plurality of feature points in response to the reference image being placed inside the predetermined region of the image of the space acquired by the image acquisition unit.

8. The method according to claim 1, wherein the authenticity judgment is used to confirm that the user of the electronic device has visited a predetermined posting spot and has viewed a posted notice that serves as the target object and that is posted at the predetermined posting spot.

9. A non-transitory computer-readable medium storing a program for causing one or more processors to execute the method according to claim 1.

10. An electronic device comprising:
at least one sensor from among a gyro sensor, an acceleration sensor, and an orientation sensor;
an image acquisition unit that acquires an image comprising one or more surroundings of a target object;

a storage unit that stores a reference image that is an image of the target object;

a feature-point position determining unit that determines a plurality of determined positions of a plurality of feature points indicating local feature quantities in the reference image in response to the reference image being placed inside a predetermined region of an image of a space to be acquired by the image acquisition unit;

a feature-point distance calculating unit that repeatedly calculates a plurality of feature-point distances, the feature-point distance calculating unit repeatedly executing a plurality of steps comprising:

obtaining the image of the space acquired by the image acquisition unit, detecting, from the image of the space acquired by the image acquisition unit, a plurality of detected points corresponding to the plurality of feature points in the reference image, and calculating a plurality of feature-point distances between the plurality of determined positions of the plurality of detected points corresponding to the plurality of feature points in the reference image and the plurality of determined positions of the plurality of feature points corresponding to the plurality of detected points;

a first judgment unit that judges whether an amount of movement of the electronic device is equal to or less than a predetermined allowable reference value based on an amount of change in a sensor value obtained from the at least one sensor and the plurality of feature-point distances;

a control unit that stores the image of the space, which is acquired by the image acquisition unit, in the storage unit as a desired image in response to the image of the space being judged that the amount of movement of the electronic device is equal to or less than the predetermined allowable reference value; and a communication unit that sends the desired image to a server that performs an authenticity judgment based on the desired image, wherein the authenticity judgment determines whether the desired image is not an image acquired by a person different from a user of the electronic device.

11. The method according to claim 1, wherein the authenticity judgment is performed based on analyzing a peripheral area around the desired image to determine that the user has visited a predetermined spot where the target object is located.

12. The method according to claim 1, wherein the authenticity judgment is performed by a server in response to receiving a viewing confirmation request from the electronic device.

* * * * *